Sept. 17, 1963 A. S. MYERS, JR 3,104,326
SELF-PROPAGATING CORE LOGIC CIRCUITS
Filed Feb. 18, 1959 3 Sheets-Sheet 1

INVENTOR.
AURIE S. MYERS JR.
BY Arthur S. Tenser
ATTORNEY

FIG. 3
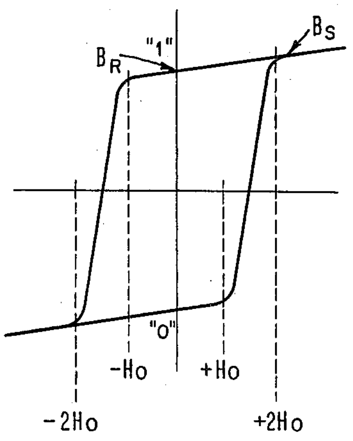
FIG. 4
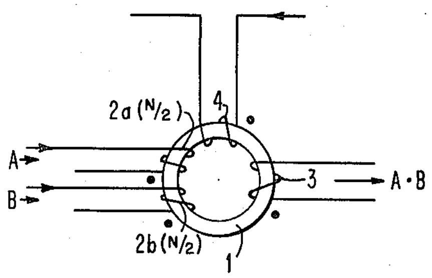
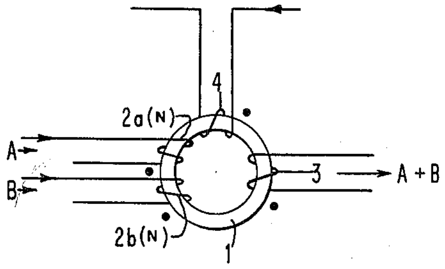
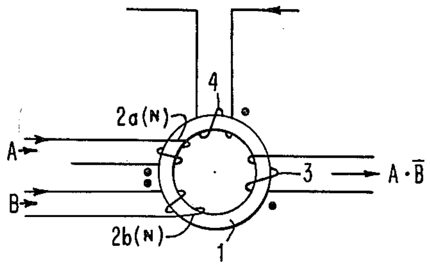
FIG. 5 FIG. 6
FIG. 7
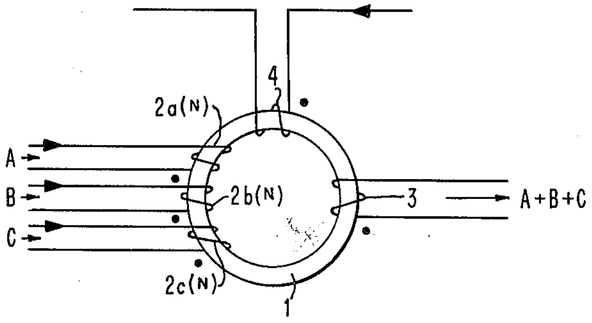

3,104,326

SELF-PROPAGATING CORE LOGIC CIRCUITS

Aurie S. Myers, Jr., Poughkeepsie, N.Y., assignor to International Business Machines Corporation, New York, N.Y., a corporation of New York Filed Feb. 18, 1959, Ser. No. 794,135
20 Claims. (Cl. 307—88)

This invention relates to logical circuits, and more particularly to such circuits employing solid state electronic components as the principal elements thereof.

As the capabilities of electronic data processing machinery are expanded to cope with the increasing requirements of modern commercial and scientific development, it becomes necessary to reevaluate the basic techniques on which these machines were built. The early machines, constructed to handle a given amount or type of data, can be enlarged only to a limited extent before they become unwieldly, unreliable, and unprofitable. As business techniques and scientific investigation grow in scope and complexity, data processing machinery capable of operating more swiftly, reliably and accurately is needed.

Many of the data processing machines in use today rely on the vacuum tube as the primary circuit element thereof. Production techniques have progressed to the point where the cost of vacuum tubes no longer is a limiting factor in the design of electronic computers. However, these elements suffer from other shortcomings which severely restrict their usefulness as machines get larger and larger. These limitations are principally size, power requirement, and life. When thousands of tubes are used in a single machine, each of these limitations becomes of great importance.

Modern component development, however, has produced the transistor, which while performing functions closely similar to those of the tube, is considerably smaller, dissipates a fraction of its power, and has an almost unlimited life expectancy. These advantages have made the transistor ideally suited for computer use in spite of its somewhat higher cost. Recent technology has also devised magnetic materials exhibiting substantially square hysteresis characteristics, enabling the fabrication of transformer cores having two stable states of magnetization and capable of developing an output voltage while being switched from one to the other. Like the transistor, the "square loop" magnetic core is small, dissipates a minute amount of power, and has an extremely long life. The properties of these two solid state electronic components have made them extremely attractive for use in electronic data processing applications.

Computer design is usually based on the building block principle. That is to say, a number of basic circuits, each performing an elementary logical function, are devised, and the logical flow of the machine is developed by interconnection of the basic circuits in a pattern which will produce the required results. By increasing the capabilities of the basic circuits, it is possible to decrease the total circuitry of the machine. This in turn, results in increased speed of operation, smaller size, and greater economy, both of initial cost and of operation. The utilization of solid state components, in an approach to logical circuitry which will capitalize on the characteristics of these components, presents an extremely efficient and versatile arrangement for computer circuitry.

It is the primary object of this invention to provide improved circuitry for use in electronic computers.

Another object of this invention is to provide a novel circuit for use in a computer which is self-powered and is capable of performing logical operations with a minimum of time delay.

A further object of this invention is to provide a novel, asynchronously operating translating circuit for use in electronic computers.

An additional object of this invention is to provide a novel basic circuit for use in computers whose active elements are of the solid state type.

It is a further object of this invention to provide a novel circuit, composed primarily of transistors and magnetic cores and capable of simple adaptation to perform a wide variety of logical operations.

The novel translating circuit of this invention comprises an input magnetic core or cores, an output core, and an amplifier. Each of the cores is fabricated of material having a square hysteresis loop, thereby providing two stable states of substantial magnetic remanence, between which the cores may be switched by application of suitably directed magnetizing forces. An input signal or signals, which may be the result of previously performed logic, are applied to windings coupled to the input cores. The potential induced in output windings during switching of the cores is used as the input to a normally inoperative amplifier. Upon actuation, the amplifier supplies energy to the input winding of the output core of the circuit. This core then switches, and a potential is developed across an output winding coupled thereto. The amplifier, which preferably is of the transistor type, has a portion of its output fed back to the input cores in such phase as to assist in switching of the cores, thereby increasing the operating speed of the circuit. There is also provided a current source, associated with additional windings on the cores, and having a twofold purpose; to set a threshold level for input signals and to return the cores to their initial state of magnetization at the conclusion of each cycle of operation.

As will be seen from the detailed description to follow, the novel arrangement of cores and amplifier provides an extremely useful circuit. The amplifier provides an overall power gain within the circuit which enables the output core to drive three or more other circuits. In addition, by utilizing the output core driven by the amplifier, the load fed by the circuit is substantially isolated from the input cores, enabling greater constancy of response. The self-powering or propagating feature of the circuit permits operation of a succession of circuits without the necessity of being periodically repowered from a central source. However, as is discussed in connection with one embodiment of the invention, the circuit may readily be synchronized to adhere to the timing cycle of the entire machine. Another and one of the more important advantages of this circuit arrangement is that several logical operations may be performed within the time necessary for a single cycle of operation. This results in appreciable savings of components as well as time. These and other advantages of the invention will become more apparent hereinafter.

Other objects of the invention will be pointed out in the following description and claims and illustrated in the accompanying drawings, which disclose, by way of example, the principle of the invention and the best modes, which have been contemplated, of applying that principle.

In the drawings:

FIG. 3 is a diagram of the hysteresis curve of the material used in the magnetic cores of the invention;

FIGS. 4 through 7 show modifications of the input circuits of the several embodiments of the invention whereby logic may be performed by the circuit;

Figure 1:
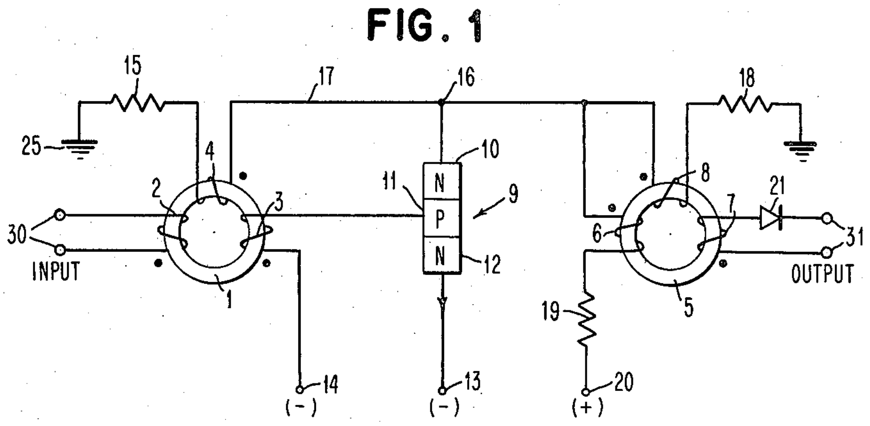
FIG. 1 is a schematic diagram of the basic transfer circuit of the invention.

Before describing the invention in detail, it is to be understood that all of the magnetic core elements shown in the drawings, are fabricated of any suitable material exhibiting a square loop hysteresis characteristics. The properties of such materials are well known and it is believed unnecessary to describe them in detail. It is deemed sufficient to note that a core made of these materials may be saturated in either of two directions, dependent upon the direction of current flow provided in the input windings magnetically coupled to the core. The square hysteresis characteristic results in substantial magnetic remanence in either direction of saturation. The core therefore, exhibits two stable conditions and may be switched from one to the other by suitably applied magnetizing currents. During the switching of a core from one condition of saturation to the other, the flux change within the core will induce a potential in a winding magnetically coupled thereto, in the manner of the ordinary transformer. For convenience in describing the invention, one of the stable conditions of each core will be termed the "0" state and the other the "1" state, in accordance with standard binary notation. As shown in the drawings, these cares may most conveniently be of toroidal shape, although other suitable configurations may be used.

FIG. 1

FIG. 1 illustrates the basic circuit of the invention. Core 1 has magnetically coupled thereto input winding 2, output winding 3, and additional winding 4. Similarly, core 5 has input winding 6, output winding 7, and additional winding 8 associated therewith. The dots associated with each of the core windings indicate terminals of like polarity, in accordance with standard transformer notation. Input signals are applied at terminals 30 to input winding 2.

Output winding 3 of core 1 has one end thereof returned to the negative terminal 14 of a source of potential. The other terminal of winding 3 is connected to the input of transistor amplifier 9. The winding 4 has one end coupled through resistor 15 to reference potential 25.

In a preferred embodiment, transistor amplifier 9 comprises a junction transistor having an emitter 12, base 11 and collector 10. In FIG. 1 and throughout the drawings, this transistor is shown as being of the NPN type, although the PNP type may be used with suitable reversal of potentials. It is also to be understood that transistor 9 may be of the point contact variety if desired. As shown, transistor 9 is connected in the well known common emitter amplifier configuration, but any suitable circuit may be employed.

Emitter 12 of transistor 9 is tied to negative terminal 13 of a source of potential. Base 11 is connected to winding 3 of core 1, and collector 10 is tied to junction point 16 on conductor 17. Conductor 17 is connected at one end to one terminal of winding 4 of core 1 and at its other end to one terminal of each of windings 6 and 8 of core 5. The other terminal of winding 8 is returned to reference potential through resistor 18. Winding 6 has its other terminal tied through resistor 19 to positive terminal 20 of a potential source. Winding 7 of core 5 is connected to output terminals 31, with diode 21 interposed in one of the connections.

Prior to commencement of a cycle of operation, cores 1 and 5 are in the same state of saturation, which will be considered the "0" state, and transistor 9 is non-conducting. This latter condition is achieved by making terminal 14 slightly more negative than terminal 13, whereby, the base-emitter junction of the transistor is reverse or back biassed. During this time, direct current is flowing from positive terminal 20 through two paths in parallel. One of these is through resistor 19, winding 6, conductor 17, winding 4 and resistor 15 to reference potential. Winding 4 is so oriented with respect to this unidirectional current flow that it tends to maintain core 1 saturated or biassed in its "0" state. The other current path is from source 20, through resistor 19, windings 6 and 8, and resistor 18 to reference potential. As can be seen from the dot notation on windings 6 and 8, this current flow would produce opposite effects on the condition of core 5; flow through winding 6 tending to switch the core to a "1" state while the current in winding 8 tends to maintain the core in its "0" state. However, winding 8 is made with a sufficiently greater number of turns than winding 6 to produce more ampere turns of magnetizing force and thereby maintain control over the state of the core. Core 5 therefore, remains in the "0" state.

Input signals applied at terminals 30, which may be of pulse form, are so polarized as to cause current flow through winding 2 in such direction as to tend to switch the core from its "0" to "1" state. This signal energy, however, must be of sufficient magnitude to overcome the bias produced by the direct current flow through winding 4. This biassing action produces two important results; it prevents operation of the circuit in response to noise or other spurious signals, and also, it sets a threshold level for input signals which enables logic to be performed. This will be more fully explained hereinafter. The threshold or bias level may be selected by choice of the impedance of resistor 15 and number of turns of winding 4.

Upon receipt of signal energy at terminals 30 sufficient to counteract the bias, core 1 begins to switch towards its "1" state. This induces a potential across output winding 3 which tends to make base 11 of transistor 9 rise in the positive direction. When base 11 becomes more positive than emitter 12, base current is supplied to the transistor which thereupon goes into saturation and becomes highly conductive. It is noted at this point, that source 20 provides collector potential for the transistor as well as being a source for the bias currents.

Conduction of transistor 9 causes its collector potential to drop substantially to that of its emitter, which is negative with respect to reference potential. This affects current flow in three separate paths. Current, which earlier flowed from source 20 into the parallel branches including windings 4 and 8, now flows through the substantially zero impedance path afforded by the transistor. This provides increased current flow through winding 6, and core 5 begins to switch to its "1" state. Current also commences to flow from reference potential, through resistor 15 and winding 4, and through transistor 9 to negative potential at 13. Similarly, current flows from reference potential through resistor 18 and winding 8 to terminal 13. As can be seen, conduction of the transistor has resulted in a reversal of the direction of current flow through the windings 4 and 8 of cores 1 and 5, respectively.

The currents now flowing through windings 4 and 8 are in such direction as to cause these windings to generate magnetizing forces tending to switch their respective cores to "1" states. By virtue of the amplification action of transistor 9, these currents are large in comparison to the bias currents flowing prior to conduction of the amplifier. Accordingly, these windings will exert relatively large magnetizing forces on their respective cores with a resultant increase in speed of switching.

Considering core 1, the input signal applied to winding 2 need be great enough to exceed the bias level set by the normal current flow from source 20 through winding 4 to reference potential. Once a voltage is induced in winding 3 sufficient to forward bias the base-emitter junction of transistor 9 and render it conducting, the input signal is no longer required. Upon reversal of current therethrough, winding 4 assumes control and because of the amplification of the transistor 9 rapidly completes the switching of the core. This regenerative action is cumulative; that is, as transistor 9 starts to conduct, winding 4 supplies magnetizing force to the core which in turn induces more potential across winding 3, thereby increasing the base current supplied to the transistor and thus increasing current through winding 4.

Conduction of the transistor amplifier also results in rapid switching of output core 5. It had been noted previously that the current flow through winding 6 prior to conduction of transistor 9 was in such direction as to tend to switch the core to a "1," but was overridden by winding 8. Upon conduction of the amplifier, current flow through winding 8 is reversed and the winding now assists in switching the core to a "1," and by virtue of the amplification of transistor 9, a much greater current flow, in the same direction as heretofore, occurs in winding 6. These two effects result in extremely rapid switching of core 5. As the core switches to its "1" state, a potential is induced across its output winding 7 and thus across output terminals 31. Diode 21, interposed in one of the leads connecting the ends of winding 7 to terminals 31 is so polarized as to permit current flow while core 5 is switched from "0" to "1," but to block current flow when the core is switched or reset to "0."

When core 1 becomes fully saturated in its "1" state, flux change in the core ceases. An induced potential no longer appears across winding 3, and base 11 of the transistor assumes the potential of source 14. This back biases the base-emitter junction and the transistor 9 stops conducting. Collector 10 now rises towards the positive potential of source 20. Because of minority carrier storage delay resulting from saturation of the transistor, collector 10 does not instantaneously rise to the potential of point 20. However, this delay is minimized by the now degenerative action of winding 4. As collector 10 rises above reference potential, current through winding 4 reverses to its original or bias level setting direction and this begins to switch core 1 back to its "0" state. As the core resets, a potential is induced across winding 3 which is of such polarity as to increase the reverse bias on base 11, thereby decreasing the turn off delay of the transistor. As is readily seen, this action is cumulative until the core is saturated in its "0" state.

As the collector 10 rises above reference potential, current flow also reverses in winding 8. Turning off of transistor 9 also reduces current flow through winding 6 so that winding 8 resumes control and returns core 5 to "0." Diode 21 now blocks current flow in the output circuit of the core so that the load to be driven is unaffected during the reset operation. The entire circuit is now back to its initial condition awaiting the next input signal.

The above described circuit achieves its utility through its ability to produce a powered output, sufficient to drive three or more other circuits, with a minimum of delay, and to do so without requiring a repowering signal from a master source. In a circuit actually built and operated, the delay between an input pulse applied at terminals 30 and an output derived at terminals 31 was 0.25 microsecond. The actual driving power available at the output was slightly under 2 watts for a ¼ watt input signal. The actual pulse widths and available reset time at the output may be changed by variation of the winding turns ratios at output core 5 and the circuit parameters of the reset circuits.

The usefulness of the above described transfer circuit as a basic logical connective will be described in reference to FIGS. 2 through 7.

FIG. 2

Figure 2:
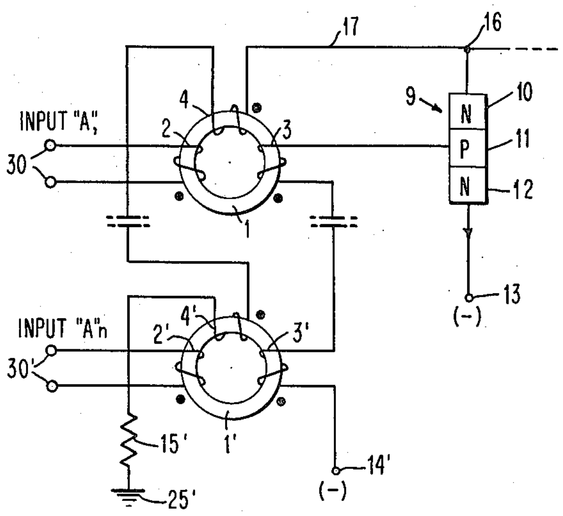
FIG. 2 shows how logic may be performed at the input of the transfer circuit.

FIG. 2 illustrates how the basic transfer circuit of

FIG. 1 may be used to perform a logical operation by the provision of additional cores at the input. Only a portion of the circuit is shown since, except for the additional cores, the circuit is identical to that of FIG. 1.

As shown, the circuit includes a first input core 1 plus one or more additional cores, one of which is shown as 1′. Core 1′ is similar to core 1 and has input winding 2′, output winding 3′ and additional winding 4′, associated therewith. The output windings 3 and 3′ are connected in series between the base 11 of transistor 9 and negative terminal 14, and are so oriented that potentials induced therein upon switching of their respective cores between like conditions will be additive. Additional windings 4 and 4′ are also series connected and couple junction point 16 through resistor 15 to reference potential 25. Separate input windings 2 and 2′ are provided for each core. The remainder of the circuit is identical to FIG. 1.

Each of the input cores and the windings coupled thereto of FIG. 2 are similar to the input arrangement of FIG. 1. Thus an input signal, sufficient to overcome the bias level, will switch any of the cores of FIG. 2, and switching of any one or more of the cores will cause conduction of transistor 9 and produce an input. Thus it will be seen that this arrangement fulfills the logical functions of "OR," that is, an output will be generated upon application of input A, OR $A_n$ OR both. It is of course understood that more than two input cores may be used, as the notation indicates. Expressed in the Boolean form, this circuit produces the output. $A+\ldots+A_n$. It is noted that addition of the cores and the resultant logical operation has not decreased the speed of operation of the circuit. Reset of the circuit is accomplished as in FIG. 1, the reset currents from the source 20 now flowing through windings 4 and 4′ in series.

It is readily apparent from the above that if desired, an AND function may also be performed by the use of multiple input cores. To achieve this operation, some criticality in the proportioning of the core windings is encountered and a certain amount of leeway in the characteristics of circuit components is lost. Nevertheless, by designing the circuit so that the sum of the voltages induced in the output windings will be great enough to bias the transistor to conduction only when *all* cores are switched simultaneously, the AND operation will be achieved; $A\cdot\ldots\cdot A_n$ in Boolean form.

FIGS. 3 TO 7

Adaptation of the basic transfer circuit to perform a single logical operation has been described. It will now be shown how use of a simple technique can render the circuit capable of producing an additional logical step with no increase in time of operation.

In FIG. 3 is shown the familiar B-H, or hysteresis, curve of the material used for the core elements. This is a plot of flux density (B) versus magnetomotive force (H). The factor H is proportional to the product of the current flowing in a winding magnetically linked to the core and the number of turns of the winding. Assuming a core initially to be in its "0" state, an increase of magnetomotive force to the point designated $2H_0$ will saturate the core and cause it to switch to its "1" state. Half of this force, or $H_0$, will not reach the saturation level and the core will remain at "0." This $H_0$ point, just short of the lower knee of the curve, may be termed the "half select" point. Similar consideration obtain along the upper portion of the curve. Reversal of force to the $-2H_0$ point will switch the bore back to "0." A similar half select point is just to the right of the upper knee of the curve.

Referring now to FIG. 4, a core element, which may be any of the input cores of FIG. 1 or 2, is shown. For convenience, like portions are numbered the same as the input core of FIG. 1. It will be noted that although the output and additional windings, 3 and 4, are the same as in FIG. 1, the input is composed of two separate windings 2*a* and 2*b*. As shown, both inputs are similarly oriented so as to generate magnetomotive force in the same direction in response to pulses of like polarity. Furthermore, in order to perform its assigned logical function, each of the windings 2*a* and 2*b* have half the number of turns of the single input cores of FIG. 1 or 2. In the description following, N will designate the usual number of turns on such single input cores. Therefore each of windings 2*a* and 2*b* has $N/2$ turns.

If a signal A of the same type providing the inputs discussed in connection with FIGS. 1 and 2, is applied to winding 2*a*, the resultant magnetomotive force supplied to the core will be $H_0$ (FIG. 3). This occurs because, while the input current (I) is the same, the number of turns has been cut in half. In this condition, the core may be said to be half selected. Similar considerations obtain for winding 2*b* for an input signal B of the same type. It is apparent that if both signals A and B occur simultaneously, the magnetomotive forces will be additive and the core will saturate. The presence of an output in winding 3 will therefore indicate the presence of both A and B at the inputs, or in Boolean notation, $A \cdot B$. It will be recognized then, that by proper selection of input windings, each of the input cores illustrated in FIGS. 1 and 2 may perform a logical function. Considering in particular the arrangement of FIG. 2, it is noted that two logical functions may be performed by the circuit with no additional delay.

In FIG. 5, the same principle is extended to form an "OR" circuit. In this case, each of the input windings 2*a* and 2*b* have a full *n* number of turns, whereby a signal at either input will produce an output; in Boolean notation $A+B$. In the circuit of FIG. 6, orientation of the lower input winding is reversed so that the presence of both A and B simultaneously will produce no net magnetomotive force. A alone will however, switch the core. This produces an output having the Boolean expression $A \cdot \overline{B}$, an extremely useful one in logical design.

FIG. 7 illustrates application of this concept to a three way input. If each of the input windings 2*a*, *b* and *c* have N number of turns, the circuit performs OR function, $A+B+C$. If the number of turns of each winding is decreased to something less than $N/2$ and the total is N or greater, the circuit can perform the AND function, since the presence of all three inputs simultaneously will be required to switch the core.

In the above discussion of FIGS. 4 through 7, the bias level set by current flow through winding 4 has been ignored. However, it is obvious that this bias will have an important effect on the operation of these circuits. Referring to FIG. 3, it is seen that in order for the additional winding 4 to perform its reset function, the unidirectional current flow therethrough when the amplifier is not operating must produce a magnetomotive force equal to or greater than $-2H_0$, since in its "1" state, a core will be at the point $B_r$ on the curve. Assuming the core to be set to "0," a magnetomotive force of $+4H_0$ will then be required to switch the core to a "1"; $+2H_0$ to counteract the $-2H_0$ bias and $+2H_0$ to saturate the core. The magnitude of the input signal necessary to afford the desired operation of these circuits must therefore produce a magnetomotive force of $+4H_0$ when applied to a winding of N turns. In FIGS. 4 through 7, as well as FIGS. 1, 8, 9 and 10, all of the input signals are selected to be of this magnitude; the variation in magnetomotive force being achieved through varying the number of turns of the input windings. Although, as discussed in connection with FIG. 1, the input signal need not be of a magnitude to saturate the core because of the regenerative action of the circuit, it has been found that input signals of such magnitude enhance the reliability and speed of these circuits. Actually, it is necessary only that the core be driven sufficiently past the knee of the curve to render the amplifier conductive (in the region between $+H_0$ and $+2H_0$) whereupon the regenerative action will complete the switching. However, by making the input signal levels high, leeway is provided in the selection of core and transistor characteristics and circuit operation becomes far less critical.

In considering the circuits shown in FIGS. 4 through 7, it is to be realized that these are merely illustrative and are not intended to show all the logical functions possible using the basic principle. It will be apparent to those skilled in the art that a great number of logical operations may be performed by variations such as in (1) the number of turns in the input windings (2) the number of input windings, (3) the orientation of the input windings, (4) the relative strengths of the input signals, and (5) the strength of the bias level set by the additional winding. It can be seen from the above discussion, however, that the basic circuit configuration lends itself admirably to the performance of several levels of logic with but a single stage of circuit delay.

FIG. 8

Figure 8:
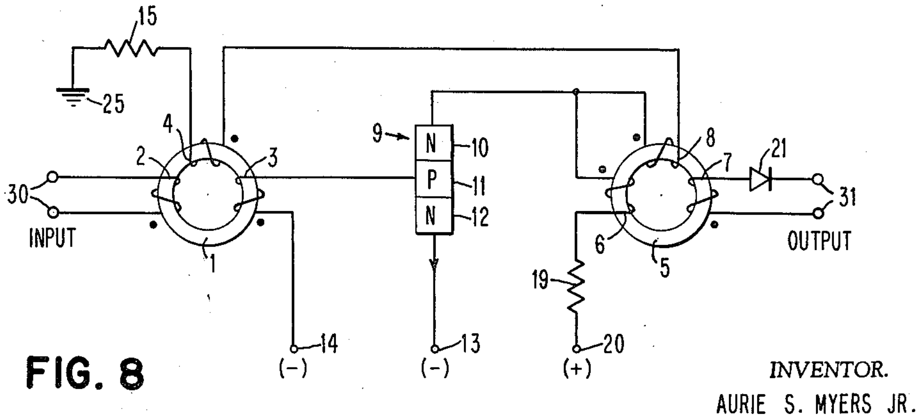
FIG. 8 is a modification of the basic transfer circuit of the invention wherein economy of components and power drain is effected.

In FIG. 8, there is illustrated a modification of the basic circuit of FIG. 1. This modification consists of connecting the additional windings 4 and 8 in series between the source 20 and reference potential rather than by a parallel connection as in FIG. 1. This eliminates the need for resistor 18 and effects a savings in direct current power drain. In all other respects, this circuit is identical to that of FIG. 1 and may similarly be used with the logical inputs of FIGS. 2 and 4 through 7.

FIG. 9

Figure 9:
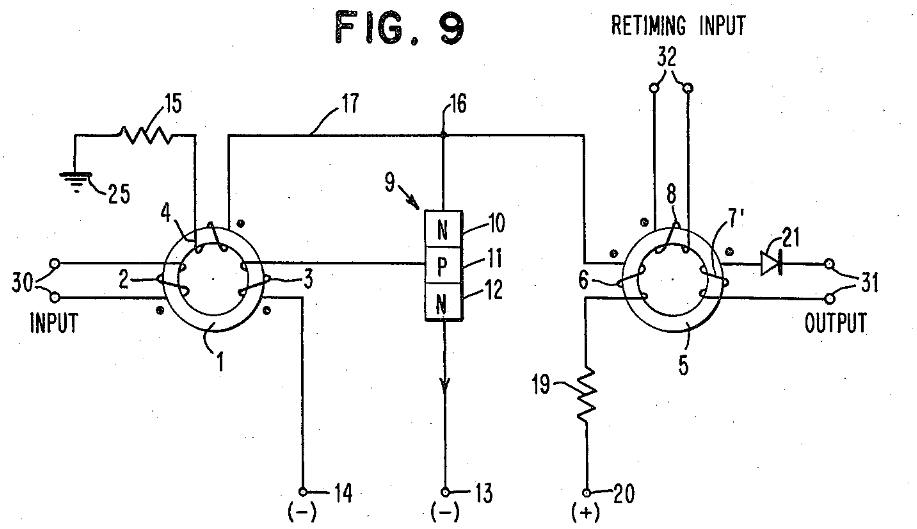
FIG. 9 is a modification of the invention wherein a clock pulse is applied to retime operation of the circuit.

FIG. 9 illustrates a further embodiment of the invention for synchronizing the operation of groups of self-propagating circuits with the timing cycle of the entire machine. As discussed hereinabove, one of the features of the system of the invention is its ability to perform series of logical operations without the necessity of being powered once each cycle from the central timing source of the machine. However, it will become necessary at intervals to retime the flow of signal energy through these circuits so as to render their operation compatible with the timing of other units of the machine. As will be seen from FIG. 9, the basic circuit of this invention allows such retiming to be performed simply and without adding an additional stage for that purpose.

The circuit of FIG. 9 is identical to that of FIG. 1 except for the output winding 7′ and additional winding 8 on the output core 5. Accordingly, logic, as discussed in reference to FIGS. 2 and 4 through 7, may be performed by the stage. Output winding 7′, it will be noted, is oriented, or polarized, in opposite sense to the winding 7 of FIG. 1. Therefore, diode 21 will block current flow through this winding when core 5 is switched by conduction of transistor 9. Winding 8 is connected to terminals 32 to which a retiming signal, such as from the master clock source of the machine, is applied. Winding 8 is not connected to source 20 as in FIG. 1, but the polarity of the retiming signal is so selected that its application to the winding will reset the core to "0." Upon resetting, a potential will be induced in output winding 7′ of such polarity that diode 21 will permit current flow. It will be noticed that by reversing the polarity of the output winding rather than that of the diode, the output signal appearing at terminals 31 of FIG. 9 is of the same polarity as the output of FIG. 1.

FIG. 10

Figure 10:
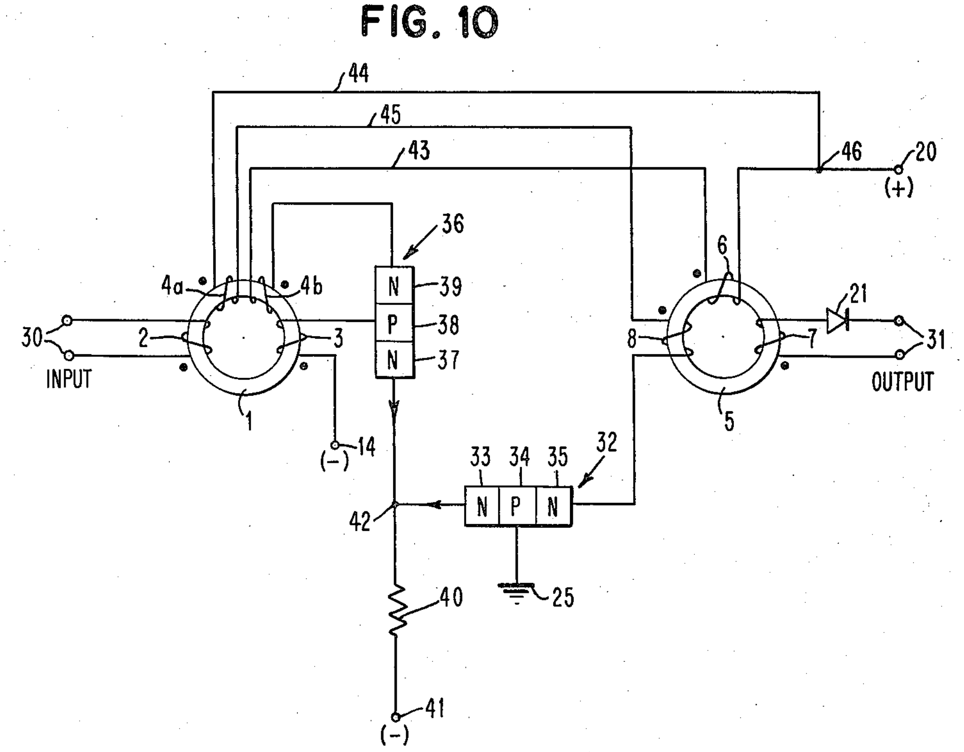
FIG. 10 is an embodiment of the invention for achieving faster operation.

The circuit of FIG. 10 provides means whereby the delay between input and output signals of the transfer circuit may be decreased. This increase in speed is effected by changing the character of the amplifier.

As shown in the drawing, a pair of transistors 32, 36 are provided in place of the single transistor 9 used in the other embodiments. Transistor 32 has its collector 35 connected to the lower terminal of additional winding 8 on core 5, its base 34 tied directly to reference potential, and its emitter 33 connected to junction point 42. Emitter 37 of transistor 36 is also connected to point 42, base 38 is coupled to the upper terminal of winding 3 of core 1, and collector 35 is connected to one terminal of winding 4*b* of core 1. As shown, the additional windings of core 1 comprise two discrete portions, 4*a* and 4*b*. The negative potential at terminal 41 and relatively large resistance 40 comprise a source providing a substantially constant current at junction point 42. Positive potential at terminal 20 provides collector voltage for both transistors.

Prior to application of an input signal, transistor 36 is kept non-conducting by the back bias on its base from terminal 14. The base-emitter junction of transistor 32 is forward biassed however, and this transistor conducts. The conducting path may be traced from source 20, to point 46, over conductor 44, through winding 4*a* of core 1, conductor 45, winding 8 on core 5 and through the transistor to negative potential 41. The direction of current flow through windings 4*a* and 8 is such as to maintain their respective cores biassed in the "0" state, in the manner discussed in the other embodiments.

Upon application of an input signal at terminals 30, core 1 begins to switch to "1" and a potential is induced across winding 3. This renders base 38 positive with respect to emitter 37 and current flow switches from transistor 32 to transistor 36. Cessation of current in the collector path of transistor 32 removes the "0" bias in cores 1 and 5.

Conduction of transistor 36 establishes current flow from source 20, point 46, through winding 6 on core 5, over conductor 43, through winding 4*b* on core 1 and through transistor 36 to negative potential 41. Current through winding 4*b* regeneratively assists in switching of the core, as discussed in reference to the winding 4 of FIG. 1. The current flow through winding 6 switches core 5 to a "1" and generates an output signal at terminals 31. When core 1 reaches saturation, potential is no longer induced in winding 3 and base 38 drops to the potential at 14, thereby cutting off conduction through transistor 36. Current then switches back to transistor 32, whose base-emitter junction becomes forward biassed when transistor 36 cuts off. Cores 1 and 5 are now reset to "0" by current flowing through windings 4*a* and 8 respectively.

The greater speed attained by this circuit results from the current switching action of the two transistors. Operation of these devices is kept out of the saturation region, whereby the switching delays occasioned by minority carrier storage are avoided. The increase in speed may justify the cost of the additional transistor where speed is the primary concern.

CONCLUSION

It will be readily perceived that the circuitry described hereinbefore provides an extremely versatile, and practical basis for logical design. Economy of components and high switching speed have been realized without sacrifice of utility or reliability. While toroidal cores and NPN junction transistors have been illustrated and described throughout, it is to be understood that any suitably shaped core element may be used and that other types of transistors or other amplifying elements may be employed.

In considering the operation of the circuits of this invention as logical connectives, it is to be borne in mind that the configurations of FIGS. 2 and 3 through 7 may be used, in any desired combinations, with each of the transfer circuits of FIGS. 1, 8, 9 and 10. While the single winding, single core input arrangement of these transfer circuits have utility, such as in power and buffer stages, the majority of stages will have inputs comprised of various combinations of the logical circuitry exemplified in FIGS. 2 and 4 through 7, and each of FIGS. 1, 8, 9 and 10 must be view in this light.

In patent applications Serial Number 794,078, for Pulse Counters, now U.S. Patent No. 3,003,067, and Serial Number 794,169, for Ring Circuits, now U.S. Patent No. 3,003,141, of Aurie S. Myers, Jr., filed concurrently herewith, other circuits, employing cores and transistors and usable in computer design, are disclosed. These circuits are compatible with and may be used with the circuits described hereinabove.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intension therefore, to be limited only as indicated by the scope of the following claims.

What is claimed is:

1. A translating circuit comprising, a magnetic core having two stable states of substantial remanence, biassing means coupled to said core tending to maintain said core in a first of said states, means for applying an input signal to said core of sufficient magnitude to counteract said biassing means and initiate switching of said core from said first state to the second stable state, amplifying means coupled to said core and operative in response to initiation of the switching of said core from said first state to said second state to supply additional energy to said core to accelerate said switching, means coupling said amplifier to said biassing means to render said biassing means inoperative during operation of said amplifier, whereby said biassing means provides a threshold level for input signals and returns said core to the first of said states upon termination of said input signal.

2. A signal translating circuit comprising, a magnetic core having two stable states of substantial remanence, input winding means, output winding means, and additional winding means coupled to said core, means providing an initial current flow in said additional winding means tendng to maintain said core in a first of said stable states, means for applying signal energy to said input winding means to initiate switching of said core from said first stable state to the second stable state, an amplifier having an input and an output, means connecting said output winding means of said core to the input of said amplifier, and means coupling said amplifier to said additional winding means, and responsive to actuation of said amplifier for discontinuing the initial current flow in said additional winding means and producing a current in said additional winding means in such direction as to assist in switching of the core.

3. A translating circuit comprising, a magnetic core having two stable states of substantial remanence, a first winding coupled to said core, means providing current flow through said winding to bias said core in a first of said stable states, a second winding coupled to said core, means for applying signal energy to said second winding to overcome said bias and initiate switching of said core from said first state to the second stable state, a third winding coupled to said core, an amplifier having an input and an output, means coupling said third winding to the input of said amplifier, and means coupling said amplifier to said first winding operable upon initiation of switching of said core to cause said first winding to supply additional energy to said core to accelerate said switching.

4. A pulse translating circuit comprising, first and second magnetic cores having two stable states of substantial remanence, input, output and additional winding means coupled to each of said cores, a signal amplifying device having an input and an output, means coupling the output winding means of said first core to the input of said amplifying device, means coupling the output of said amplifying device to the additional winding means of said first core and to the input winding means of said second core to cause both said cores to shift from one stable state to another upon operation of said amplifying device, a source of unidirectional current, and means connecting said source to the additional winding means of both said cores for shifting both said cores back to said one stable state upon cessation of the output of said amplifying device.

5. A signal translating circuit comprising first and second magnetic core means, said core means being fabricated of a material having two stable states of substantial remanence, input, output and additional winding means coupled to said first and second core means, means providing an initial current flow in said additional winding means of said first core means tending to maintain said first core means in a first of said stable states, means for applying signal energy to the input winding means of said first core means to initiate switching of said first core means from said first stable state to the second stable state, an amplifier having an input and an output, means connecting the output winding means of said first core means to the input of said amplifier, means connecting the output of said amplifier to the input winding means of said second core means, and further means connecting the output of said amplifier to the additional winding means of said first core means operable upon actuation of said amplifier to discontinue the initial current flow in said additional winding means of said first core means and to produce a current flow in said additional winding means in such direction as to aid the switching of the first core means.

6. The circuit of claim 5 above, wherein said input winding means of said first core means comprise means to couple a plurality of separate signal energy sources to said first core means.

7. The apparatus of claim 5 above, wherein said input winding means of said first core means comprises a plurality of discrete winding portions, each of which is coupled to an individual signal energy source.

8. The apparatus of claim 5 above, wherein said first core means comprises a plurality of magnetic core elements.

9. The circuit of claim 8, wherein said input winding means of said first core means comprises a plurality of discrete winding portions, each coupled to an individual signal energy source, and at least one of which is coupled to each of said plurality of magnetic core elements.

10. A signal transfer circuit comprising first and second magnetic core means, said core means being fabricated of a material having two stable states of substantial remanence, input, output and additional winding means associated with each of said first and second core means, circuit means including said additional winding means of said first core means to bias said first core means in a first of said stable states, means to apply signal energy to said input winding means of said first core means to overcome said bias and initiate switching of said core means from said first stable state to the second stable state, an amplifier having an input and an output, means connecting the output winding means of said first core means to the input of said amplifier, means coupling the output of said amplifier to the input winding means of said second core means whereby said second core means is switched from its first stable state to its second stable state upon operation of said amplifier, means responsive to operation of said amplifier to remove said bias from said first core means and to supply energy to said additional winding means of said first core means to accelerate switching of said first core means, and means coupled to said additional winding means of said second core means to return said second core means to its first stable state upon deactivation of said amplifier.

11. A signal transfer circuit comprising, a first magnetic core having two stable states of substantial remanence, a second magnetic core having two stable states of substantial remanence, input, output and additional winding means associated with each of said cores, a source of unidirectional current, means connecting said source to said additional winding means of said first core to bias said core in a first of said stable states, means for supplying energy to said input winding means of said first core to counteract said bias and initiate switching of said core from said first stable state to its second stable state, a transistor amplifier having an input and an output, means coupling the output winding means of said first core to the input of said amplifier to render said amplifier operative upon initiation of switching of said core, means coupling the output of said amplifier to said additional winding means of said first core and responsive to operation of said amplifier to remove said bias and provide current flow in said additional winding means in such direction as to assist in switching of said first core, means coupling the output of said amplifier to the input winding means of said second core to switch said core from a first stable state to a second stable state in response to operation of said amplifier, means to derive an output signal from said output winding means of said second core, and means including both said additional winding means to return both said cores to their respective first stable states upon cessation of operation of said amplifier.

12. The circuit of claim 11, above, wherein said additional winding means of said second core is connected to said unidirectional current source and to the output of said amplifier, whereby said additional winding functions to bias said second core to a first stable state prior to operation of said amplifier and to assist in switching said core to its second stable state in response to operation of said amplifier.

13. The circuit of claim 11 above, wherein said additional winding means of said first and second cores are connected in parallel between said unidirectional current source and a point of reference potential.

14. The circuit of claim 11 above, wherein said additional winding means of said first and second cores are connected in series between said unidirectional current source and a point of reference potential.

15. The circuit of claim 11 above further comprising an independent signal source coupled to said additional winding of said second core for returning said second core to its first stable state.

16. The circuit of claim 11 above wherein said additional winding means of said first core comprises a pair of discrete portions, said unidirectional current source being connected to one of said portions and the output of said amplifier being connected to the other of said portions.

17. The circuit of claim 11 above wherein said unidirectional current source comprises a transistor.

18. A signal translating circuit comprising, a magnetic core having two stable states of substantial remanence, input, output, and additional winding means coupled to said core, a source of unidirectional potential, means connecting said source with said additional winding means to provide an initial current flow therethrough tending to maintain said core in a first of said stable states, means for applying signal energy to said input winding means to initiate switching of said core from said first stable state to the second stable state, an amplifier having an input and an output, means connecting said potential source to provide operating potentials for said amplifier, means connecting said output winding means of said core to the input of said amplifier, and means connecting the output of said amplifier to said additional winding means operable upon actuation of said amplifier to discontinue the initial current flow in said additional winding means and to produce a current in said additional winding means in such direction as to assist in switching of the core to a second stable state.

19. The circuit of claim 18 above, wherein said amplifier comprises a transistor and said potential source provides collector potential therefor.

20. A signal translating circuit comprising a magnetic core having first and second stable states of substantial remanence; first, second and third windings on said core; a normally non-conductive amplifier having an input electrode and two output electrodes; a source of high potential; a source of intermediate potential; a source of low potential; first circuit means connecting a first one of the output electrodes of said amplifier to said source of low potential; second circuit means connecting a second one of said output electrodes to said source of high potential; load means in said second circuit means; third circuit means connecting said first winding on said core between said source of intermediate potential and said second output electrode for passing current through said first winding from the high potential source to the intermediate potential source to bias said core in the first stable state; input means connected to said second winding for initiating switching of said core from the first state toward the second state; and fourth circuit means connecting said third winding to the input electrode of said amplifier for rendering said amplifier conductive in response to initiation of said switching, whereby to cause current flow through said first winding from the intermediate potential source to the low potential source to aid in switching the core from the first state to the second state.

References Cited in the file of this patent

UNITED STATES PATENTS

| | | |
|---|---|---|
| 2,691,155 | Rosenberg et al. | Oct. 5, 1954 |
| 2,695,993 | Haynes | Nov. 30, 1954 |
| 2,850,236 | Schaefer et al. | Sept. 2, 1958 |
| 2,866,178 | Lo et al. | Dec. 23, 1958 |
| 2,956,244 | Finkel et al. | Oct. 11, 1960 |
| 2,991,457 | Hoffman et al. | July 4, 1961 |

OTHER REFERENCES

"A Transistor-Magnetic Core Circuit, a New Device Applied to Digital Computing Techniques," by Guterman, et al., 1955, IRE, Convention Record, part 4, pages 84–94, March 21–24, 1955.